(12) United States Patent
Togashi

(10) Patent No.: US 7,050,289 B2
(45) Date of Patent: May 23, 2006

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/048,791

(22) Filed: Feb. 3, 2005

(65) Prior Publication Data

US 2005/0190529 A1    Sep. 1, 2005

(30) Foreign Application Priority Data

Feb. 26, 2004  (JP) ............................. 2004-051623

(51) Int. Cl.
*H01G 4/228* (2006.01)
(52) U.S. Cl. ............................ 361/306.3; 361/321.2; 361/308.1; 361/310; 29/25.41
(58) Field of Classification Search ............ 361/306.1, 361/306.3, 308.1, 309–310, 311–313, 321.1, 361/321.2, 321.3, 321.4, 301.4, 328–329, 361/25.41
See application file for complete search history.

(56) References Cited

U.S. PATENT DOCUMENTS

| | | | | |
|---|---|---|---|---|
| 6,441,459 B1 * | 8/2002 | Togashi et al. | ............. | 257/532 |
| 6,577,486 B1 * | 6/2003 | Nishimiya et al. | .......... | 361/104 |
| 6,657,848 B1 * | 12/2003 | Togashi et al. | .......... | 361/306.3 |
| 6,765,781 B1 * | 7/2004 | Togashi | ................... | 361/306.3 |

FOREIGN PATENT DOCUMENTS

| | | |
|---|---|---|
| JP | 2001-284170 | 10/2001 |
| JP | 2001-284171 | 10/2001 |
| JP | 2003-168621 | 6/2003 |

* cited by examiner

Primary Examiner—Anthony Dinkins
(74) Attorney, Agent, or Firm—Oblon, Spivak, McClelland, Maier & Neustadt, P.C.

(57) ABSTRACT

A multilayer capacitor includes: a dielectric element; a pair of first internal conductors with same polarity disposed in the dielectric element to be adjacent to each other while being separated from each other by the dielectric layer; first leadout portions led out from the pair of first internal conductors respectively, one being provided for each of the first internal conductors; a pair of second internal conductors with same polarity disposed in the dielectric element to be adjacent to each other while being separated from each other by the dielectric layer; and second leadout portions led out from the pair of second internal conductors respectively, one being provided for each of the second internal conductors, wherein the first leadout portion and the second leadout portion led out respectively from the first internal conductor and the second internal conductor disposed adjacent to each other are led out to substantially the same positions in side faces facing each other of the dielectric element, respectively. Therefore, a multilayer capacitor capable of reducing equivalent series inductance to reduce voltage fluctuation of a power source of a CPU is obtained.

20 Claims, 14 Drawing Sheets

F I G. 7(A)
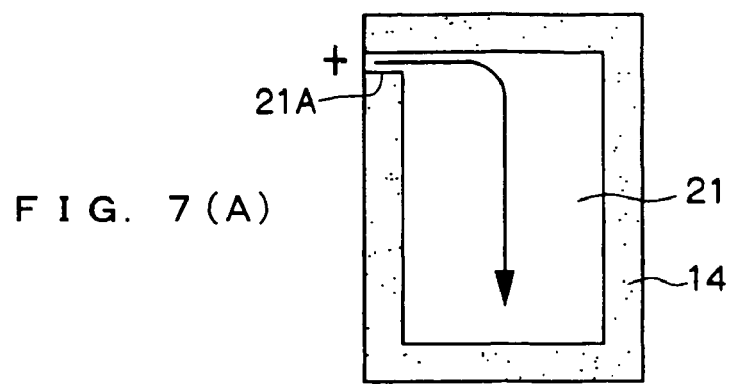
F I G. 7(B)
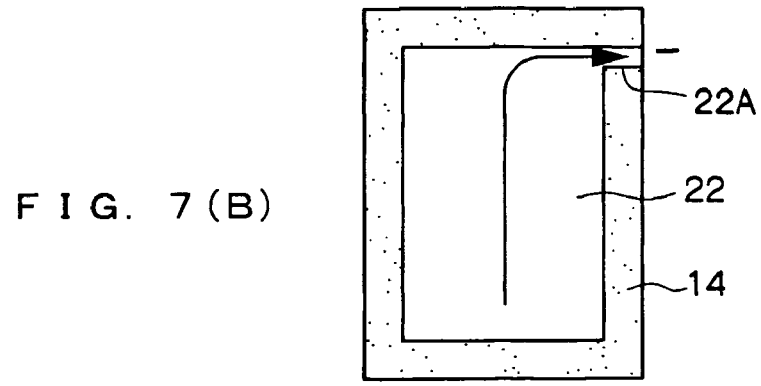
F I G. 7(C)
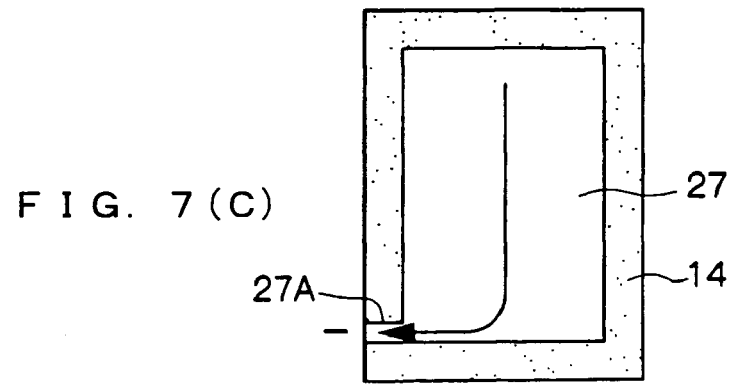
F I G. 7(D)
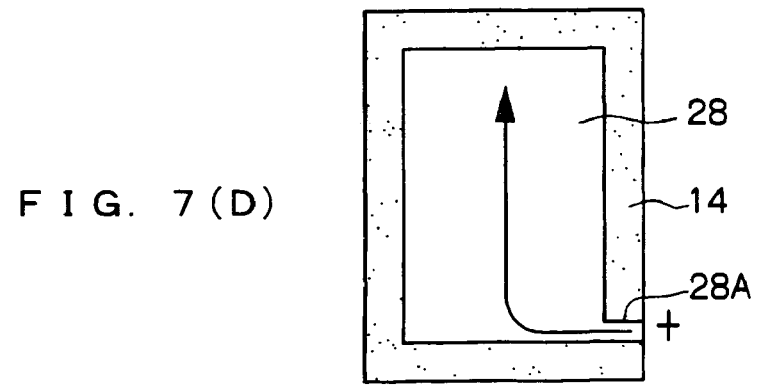
← FLOW OF CURRENT

← FLOW OF CURRENT

← FLOW OF CURRENT

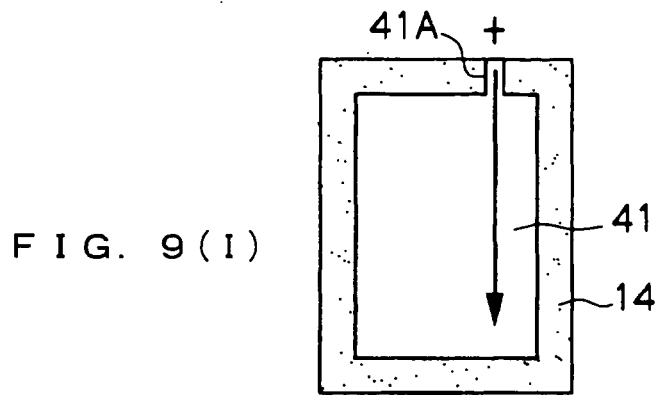
F I G. 9 (I)
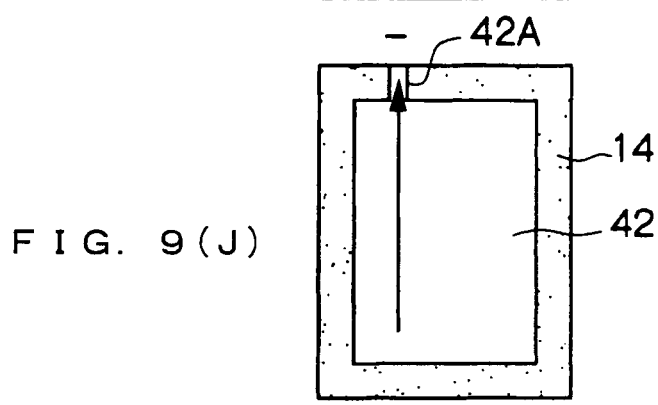
F I G. 9 (J)
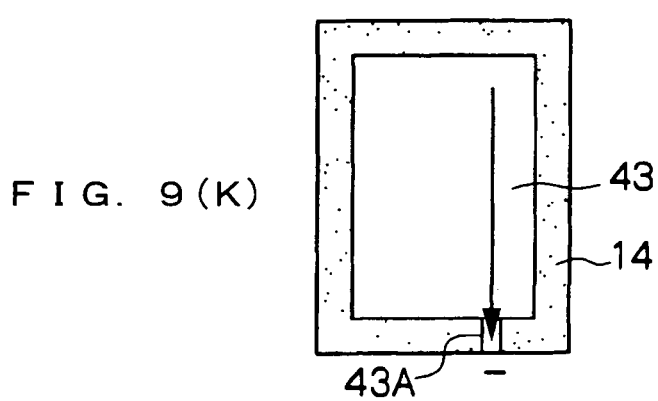
F I G. 9 (K)
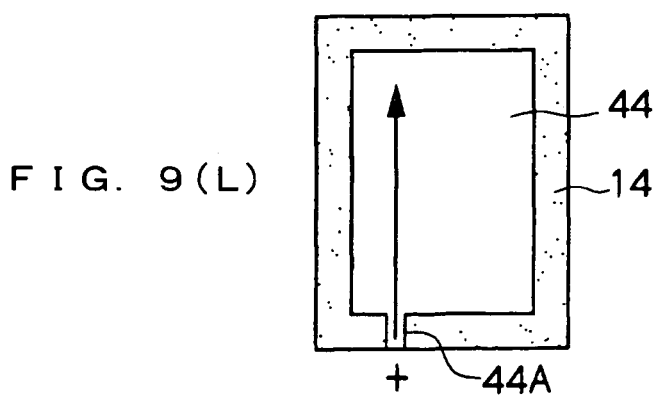
F I G. 9 (L)
FLOW OF CURRENT

← FLOW OF CURRENT          ← FLOW OF CURRENT

← FLOW OF CURRENT

← FLOW OF CURRENT

MULTILAYER CAPACITOR

BACKGROUND OF THE INVENTION

1. Field of the Invention

The present invention relates to a multilayer capacitor that realizes reduced equivalent series inductance (ESL), and more particularly, to that suitable for use as a multi-terminal multilayer ceramic chip capacitor capable of reducing voltage fluctuation of a power source of a CPU.

2. Description of the Related Art

In recent years, due to an improved processing speed and a higher integration degree of a CPU (central processing unit) used for a data processor, its operating frequency is becoming higher and its current consumption is remarkably increasing. In accordance therewith, the operating voltage has been on the decreasing trend due to reduced power consumption. This has caused the occurrence of a higher-speed and larger current fluctuation in a power source for supplying power to the CPU, and it has become very difficult to control voltage fluctuation accompanying this current fluctuation, within an allowable value range of this power source.

Therefore, as a measure for stabilizing the power source, a multilayer capacitor as a smoothing capacitor is disposed in the vicinity of the CPU in the state of being connected to the power source and has come in frequent use. By quick charge/discharge at the time of a high-speed transient current fluctuation, the multilayer capacitor supplies a current to the CPU, thereby reducing the voltage fluctuation of the power source.

Here, the structure of internal electrodes of a multilayer capacitor of this conventional example is shown in FIG. 12(A) to FIG. 12(H) and the multilayer capacitor of the conventional example will be described based on the drawings. Specifically, this multilayer capacitor is structured such that ceramic layers 114 having internal electrodes 121 to 128 thereon respectively are stacked in the order of FIG. 12(A) to FIG. 12(H) so that capacitance is obtained, thereby forming a dielectric element. These internal electrodes 121 to 128 are led out to two side faces facing each other of the dielectric element in sequence, so that the respective internal electrodes 121 to 128 are connected to not-shown terminal electrodes provided on the side faces facing each other of the multilayer capacitor.

However, today's trend toward a still higher frequency of the operating frequency of the CPU has resulted in higher-speed and larger current fluctuation, and consequently, equivalent series inductance (ESL) that the multilayer capacitor itself has become relatively large. As a result, this equivalent series inductance gives a significant influence to the voltage fluctuation of the power source.

Specifically, in the conventional multilayer capacitor used in a power source circuit of the CPU, due to the high ESL being a parasitic component, total inductance of a circuit having this multilayer capacitor has become high. As a result, this ESL hinders charging/discharging of the multilayer capacitor in accordance with the occurrence of the current fluctuation, which tends to increase the voltage fluctuation of the power source. Therefore, it is becoming impossible to respond to a future increase in speed of the CPU.

SUMMARY OF THE INVENTION

In view of the above-described circumstances, it is an object of the present invention to provide a multilayer capacitor realizing reduced equivalent series inductance, thereby achieving reduction in voltage fluctuation of a power source of a CPU.

According to one of the modes of the present invention, provided is a multilayer capacitor including: a dielectric element formed of a stack of dielectric layers; a pair of first internal conductors with same polarity disposed in the dielectric element to be adjacent to each other while being separated from each other by the dielectric layer; first leadout portions led out from the pair of first internal conductors respectively, one being provided for each of the first internal conductors; a pair of second internal conductors with same polarity disposed in the dielectric element to be separated from the pair of first internal conductors by the dielectric layers and to be adjacent to each other while being separated from each other by the dielectric layer; and second leadout portions led out from the pair of second internal conductors respectively, one being provided for each of the second internal conductors, wherein the first leadout portion and the second leadout portion led out respectively from the first internal conductor and the second internal conductor disposed adjacent to each other are led out to substantially same positions in side faces facing each other of the dielectric element.

The multilayer capacitor as structured above has the following operation.

In the multilayer capacitor according to this mode, the pair of first internal conductors with the same polarity are disposed in the dielectric element, which are formed of a stack of the dielectric layers, to be adjacent to each other while being separated from each other by the dielectric layer. Further, the pair of second internal conductors with the same polarity are disposed in the dielectric element to be separated from the pair of first internal conductors by the dielectric layers, and to be adjacent to each other while being separated from each other by the dielectric layer.

Further, one first leadout portion is led out from each of the pair of first internal conductors, and one second leadout portion is led out from each of the pair of second internal conductors. Note that the first leadout portion and the second readout portion led out respectively from the first internal conductor and the second internal conductor disposed adjacent to each other are led out to substantially the same positions in the side faces facing each other of the dielectric element.

In short, out of the pair of first internal conductors and the pair of second internal conductors, the first internal conductor and the second internal conductor disposed adjacent to each other serve as capacitor electrodes disposed to face each other and to be in parallel with each other. In addition, the first leadout portion and the second leadout portion of these first internal conductor and second internal conductor are led out respectively at substantially the same positions in the side faces facing each other of the dielectric element.

Therefore, when electric current is supplied to this multilayer capacitor, the first internal conductor and the second internal conductor that are disposed adjacent to each other via the dielectric layer have different polarities from each other. Accordingly, because of the arrangement of the first leadout portion and the second leadout portion, electric current in the first internal conductor and electric current in the second internal conductor flow in reverse directions.

Consequently, in the multilayer capacitor according to this mode, magnetic fluxes generated by high-frequency current passing in the internal conductors are cancelled by each other to reduce parasitic inductance that the multilayer capacitor itself has, so that equivalent series inductance (ESL) is reduced. Accordingly, ESL is further reduced to greatly reduce total inductance of a circuit. As a result, according to this mode, it is possible to surely inhibit voltage fluctuation of a power source, so that an optimum multilayer capacitor as a power source of a CPU can be obtained.

According to another mode of the present invention, provided is a multilayer capacitor including: a dielectric element formed of a stack of dielectric layers; a pair of first internal conductors with same polarity disposed in the dielectric element to be adjacent to each other while being separated from each other by the dielectric layer; first leadout portions led out from the pair of first internal conductors respectively, one being provided for each of the first internal conductors; a pair of second internal conductors with same polarity disposed in the dielectric element to be separated from the pair of first internal conductors by the dielectric layers and to be adjacent to each other while being separated from each other by the dielectric layer; and second leadout portions led out from the pair of second internal conductors respectively, one being provided for each of the second internal conductors, wherein a plurality of sets of the pair of first internal conductors and a plurality of sets of the pair of second internal conductors are provided, and the pairs of first internal conductors and the pairs of second internal conductors are alternately stacked in the dielectric element, and wherein the first readout portions and the second leadout portions led out respectively from the first internal conductors and the second internal conductors disposed adjacent to each other are led out to substantially same positions in side faces facing each other of the dielectric element, respectively.

The multilayer capacitor as structured above has the following operation.

The multilayer capacitor according to this mode includes the same structure as that of the multilayer capacitor according to the mode described above. In addition, it has the structure such that the plural sets of the pair of first internal conductors and the plural sets of the pair of second internal conductors are provided, and the pairs of first internal conductors and the pairs of second internal conductors are alternately stacked in the dielectric element.

Therefore, the same operation as that of the multilayer capacitor of the mode described above can be obtained, and in addition, since the plural sets of the pair of first internal conductors and the plural sets of the pair of second internal conductors are alternately stacked, it is possible to dispose a large number of these internal conductors which serve as capacitor electrodes. Accordingly, it is possible to easily increase capacitance to a required size.

According to still another mode of the present invention, provided is a multilayer capacitor including: a dielectric element formed of a stack of dielectric layers; a pair of first internal conductors with same polarity disposed in the dielectric element to be adjacent to each other while being separated from each other by the dielectric layer; first leadout portions led out from the pair of first internal conductors respectively, one being provided for each of the first internal conductors; a pair of second internal conductors with same polarity disposed in the dielectric element to be separated from the pair of first internal conductors by the dielectric layers and to be adjacent to each other while being separated from each other by the dielectric layer; and second leadout portions led out from the pair of second internal conductors respectively, one being provide for each of the second internal conductors, wherein a plurality of sets of the pair of first internal conductors are disposed in the dielectric element with positions of the first leadout portions thereof being different from each other, and a plurality of sets of the pair of second internal conductors are disposed in the dielectric element with positions of the second leadout portions thereof being different from each other, and wherein the first leadout portions and the second leadout portions respectively led out from the first internal conductors and the second internal conductors disposed adjacent to each other are led out to substantially same positions in side faces facing each other of the dielectric element, respectively.

The multilayer capacitor as structured above has the following operation.

The multilayer capacitor according to this mode includes the same structure as that of the multilayer capacitor according to the mode previously described. It further includes the structure such that the plural sets of the pair of first internal conductors are disposed in the dielectric element with the positions of the first readout portions thereof being different from each other and the plural sets of the pair of second internal conductors are disposed in the dielectric element with the positions of the second leadout portions thereof being different from each other.

Therefore, the same operation as that of the multilayer capacitor according to the aforesaid mode can be obtained, and in addition, the positions of the respective leadout portions of the pair of first internal conductors and the pair of second internal conductors do not coincide with each other. Accordingly, it is possible to reduce equivalent series inductance (ESL) as well as to make effective use of the side faces of the dielectric element.

Meanwhile, as a modification example of the multilayer capacitors according to the respective modes of the present invention described above, besides the structures of the respective modes, it is conceivable to add the structure such that a plurality of terminal electrodes are disposed on the side faces of the dielectric element and the first leadout portions and the second leadout portions are individually connected to the respective terminal electrodes.

Therefore, according to this modification example, the same operations as those of the above-described modes are obtained, and in addition, it is possible to surely supply electric current to the first internal conductors and the second internal conductors, which serve as capacitor electrodes, from an external circuit via the terminal electrodes connected to the first leadout portions and the terminal electrodes connected to the second leadout portions. Accordingly, these terminal electrodes make it possible to surely achieve functions as the multilayer capacitor.

Further, as another modification example of the multilayer capacitors according to the respective modes of the present invention described above, besides the structures of the respective modes, it is conceivable to add the structure such that in part, the first leadout portion and the second leadout portion respectively led out from the first internal conductor and the second internal conductor disposed adjacent to each other are led out to respective positions adjacent to each other in the same side face of the dielectric element.

In short, the first leadout portion and the second leadout portion of the first internal conductor and the second internal conductor that are disposed adjacent to each other are respectively led out to the positions adjacent to each other in the same side face of the dielectric element. Because of this structure, when electric current is supplied to this multilayer capacitor, the first internal conductor and the second internal conductor that are disposed adjacent to each other via the dielectric layer have different polarities from each other. Accordingly, the same operations as those of the multilayer capacitors of the respective modes are obtained, and in addition, electric current in the first internal conductor and electric current in the second internal conductor flow in reverse directions.

As a result, with the structure described above, magnetic fluxes generated by high-frequency electric current flowing in the internal conductors are also cancelled by each other, so that the operations and effects of the multilayer capacitors of the respective modes are further enhanced.

BRIEF DESCRIPTION OF THE DRAWINGS

FIG. 2(A) to FIG. 2(H) are plane views showing the internal electrodes whose stacking order in the multi-terminal multilayer capacitor according to the first embodiment of the present invention is shown by FIG. 2(A) to FIG. 2(H); in which FIG. 2(A) shows the internal electrode having a leadout portion at a back end portion on a left end side; FIG. 2(B) shows the internal electrode having a leadout portion at a back end portion on a right end side; FIG. 2(C) shows the internal electrode having a leadout portion at a position closer to the back end portion on the left end side; FIG. 2(D) shows the internal electrode having a leadout portion at a position closer to the back end portion on the right end side; FIG. 2(E) shows the internal electrode having a leadout portion at a position closer to a front end portion on the left end side; FIG. 2(F) shows the internal electrode having a leadout portion at a position closer to a front end portion on the right end side; FIG. 2(G) shows the internal electrode having a leadout portion at the front end portion on the left end side; and FIG. 2(H) shows the internal electrode having a leadout portion at the front end portion on the right end side;

FIG. 7(A) to FIG. 7(D) are plane views showing internal electrodes whose stacking order in a multi-terminal multilayer capacitor according to a second embodiment of the present invention is shown by FIG. 7(A) to FIG. 7(D), in which FIG. 7(A) shows the internal electrode having a leadout portion at a back end portion on a left end side; FIG. 7(B) shows the internal electrode having a leadout portion at a back end portion on a right end side; FIG. 7(C) shows the internal electrode having a leadout portion at a front end portion on the left end side; and FIG. 7(D) shows the internal electrode having a leadout portion at a front end portion on the right end side;

FIG. 9(A) to FIG. 9(L) are plane views showing internal electrodes whose stacking order in a multi-terminal multilayer capacitor according to a third embodiment of the present invention is shown by FIG. 9(A) to FIG. 9(L), in which FIG. 9(A) shows the internal electrode having a leadout portion at a back end portion on a left end side; FIG. 9(B) shows the internal electrode having a leadout portion at a back end portion on a right end side; FIG. 9(C) shows the internal electrode having a leadout portion at a position closer to the back end portion on the left end side; FIG. 9(D) shows the internal electrode having a leadout portion at a position closer to the back end portion on the right end side; FIG. 9(E) shows the internal electrode having a readout portion at a position closer to a front end portion on the left end side; FIG. 9(F) shows the internal electrode having a leadout portion at a position closer to a front end portion on the right end side; FIG. 9(G) shows the internal electrode having a leadout portion at the front end portion on the left end side; FIG. 9(H) shows the internal electrode having a leadout portion at the front end portion on the right end side; FIG. 9(I) shows the internal electrode having a leadout portion at a position closer to a right end portion on an upper end side; FIG. 9(J) shows the internal electrode having a leadout portion at a position closer to a left end portion on the upper end side; FIG. 9(K) shows the internal electrode having a leadout portion at a position closer to a right end portion on a lower end side; and FIG. 9(L) shows the internal electrode having a leadout portion at a position closer to a left end portion on the lower end side;

FIG. 11(A) to FIG. 11(H) are plane views showing internal electrodes whose stacking order in a multi-terminal multilayer capacitor according to a fourth embodiment of the present invention is shown by FIG. 11(A) to FIG. 11(H), in which FIG. 11(A) shows the internal electrode having a leadout portion at a back end portion on a left end side; FIG. 11(B) shows the internal electrode having a leadout portion at a back end portion on a right end side; FIG. 11(C) shows the internal electrode having a leadout portion at a position closer to a front end portion on the right end side; FIG. 11(D) shows the internal electrode having a leadout portion at a position closer to the back end portion on the right end side; FIG. 11(E) shows the internal electrode having a leadout portion at the front end portion on the right end side; FIG. 11(F) shows the internal electrode having a leadout portion at a front end portion on the left end side; FIG. 11(G) shows the internal electrode having a leadout portion at a position closer to the back end portion on the left end side; and FIG. 11(H) shows the internal electrode having a leadout portion at a position closer to the front end portion on the left end side; and FIG. 12(A) to FIG. 12(H) are plane views showing internal electrodes whose stacking order in a multi-terminal multilayer capacitor according to a conventional example is shown by FIG. 12(A) to FIG. 12(H), in which FIG. 12(A) shows the internal electrode having a leadout portion at a back end portion on a left end side; FIG. 12(B) shows the internal electrode having a leadout portion at a position closer to the back end portion on the left end side; FIG. 12(C) shows the internal electrode having a leadout portion at a position closer to a front end portion on the left end side; FIG. 12(D) shows the internal electrode having a leadout portion at the front end portion on the left end side; FIG. 12(E) shows the internal electrode having a leadout portion at a front end portion on a right end side; FIG. 12(F) shows the internal electrode having a leadout portion at a position closer to the front end portion on the right end side; FIG.

12(G) shows the internal electrode having a leadout portion at a position closer to a back end portion on the right end side; and FIG. 12(H) shows the internal electrode having a leadout portion at the back end portion on the right end side.

DETAILED DESCRIPTION OF THE PREFERRED EMBODIMENTS

A multi-terminal multilayer capacitor 10 as a multilayer capacitor according to a first embodiment of the present invention is shown in FIG. 1 to FIG. 6. As shown in these drawings, the multi-terminal multilayer capacitor 10 according to this embodiment includes, as a main body portion thereof, a dielectric element 12 being a multilayer body in a rectangular parallelepiped shape that is obtained by sintering a stack of a plurality of ceramic green sheets which are dielectric sheets.

Figure 1:
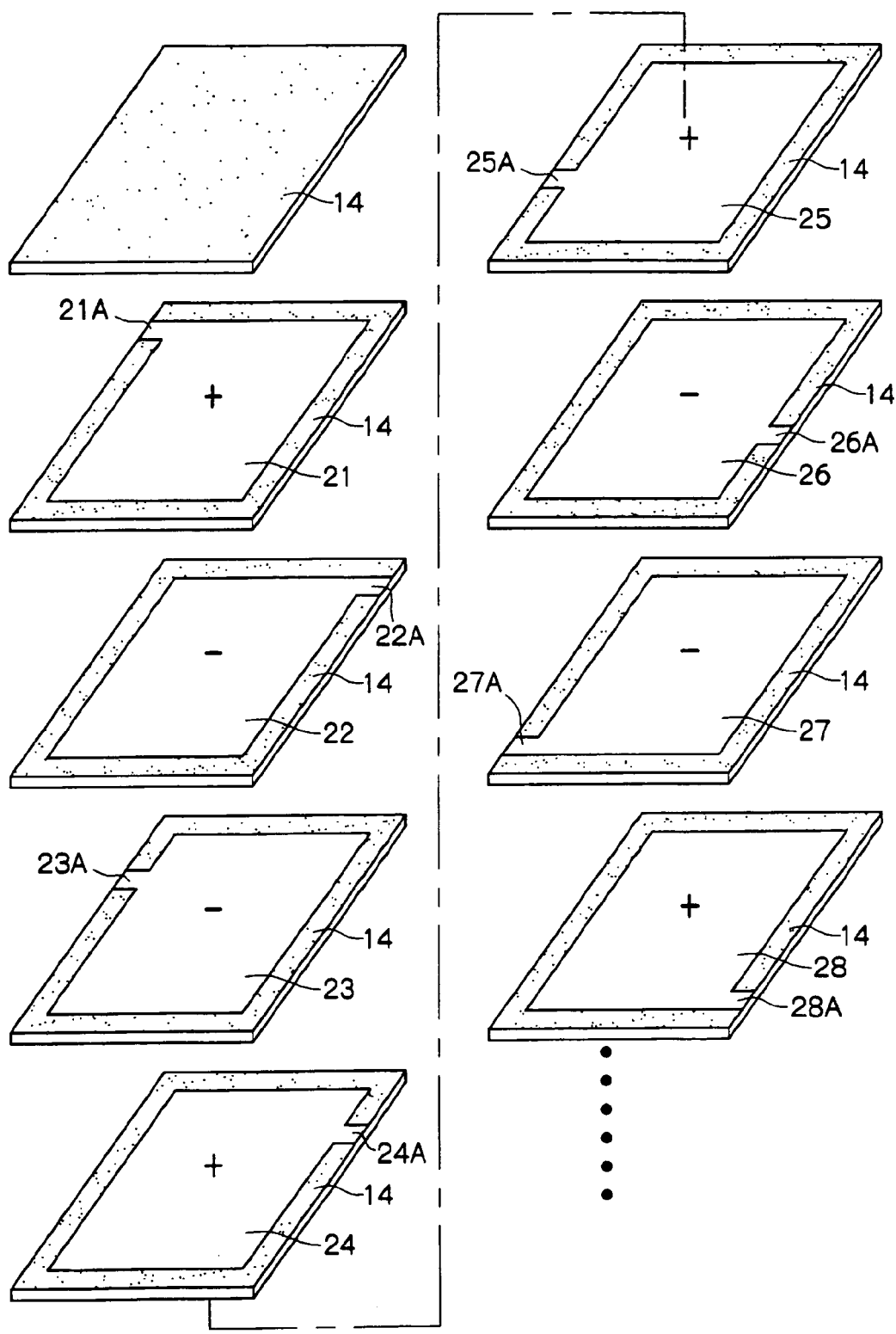
FIG. 1 is an exploded perspective view showing internal electrodes of a multi-terminal multilayer capacitor according to a first embodiment of the present invention.
Figure 2:
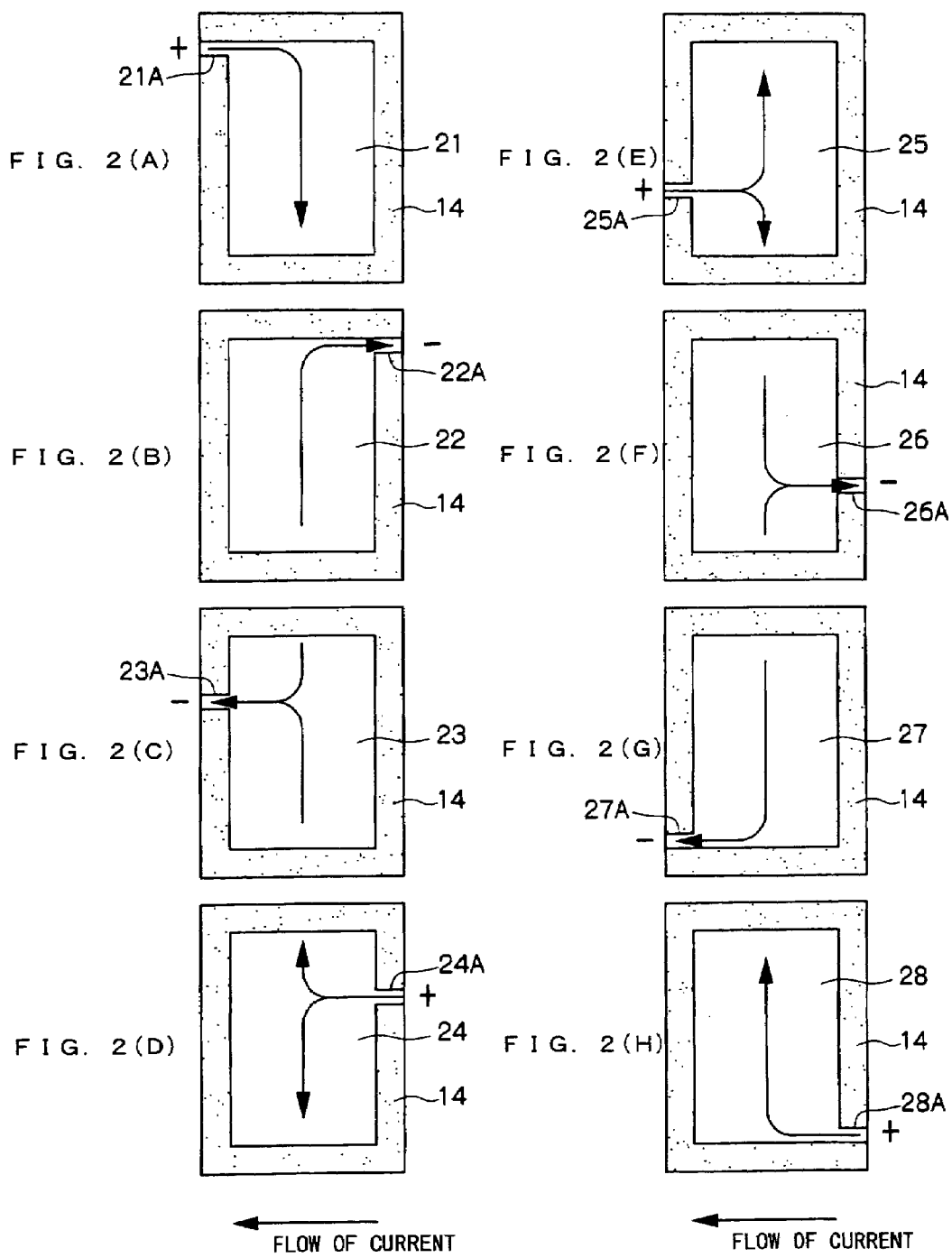
Figure 4:
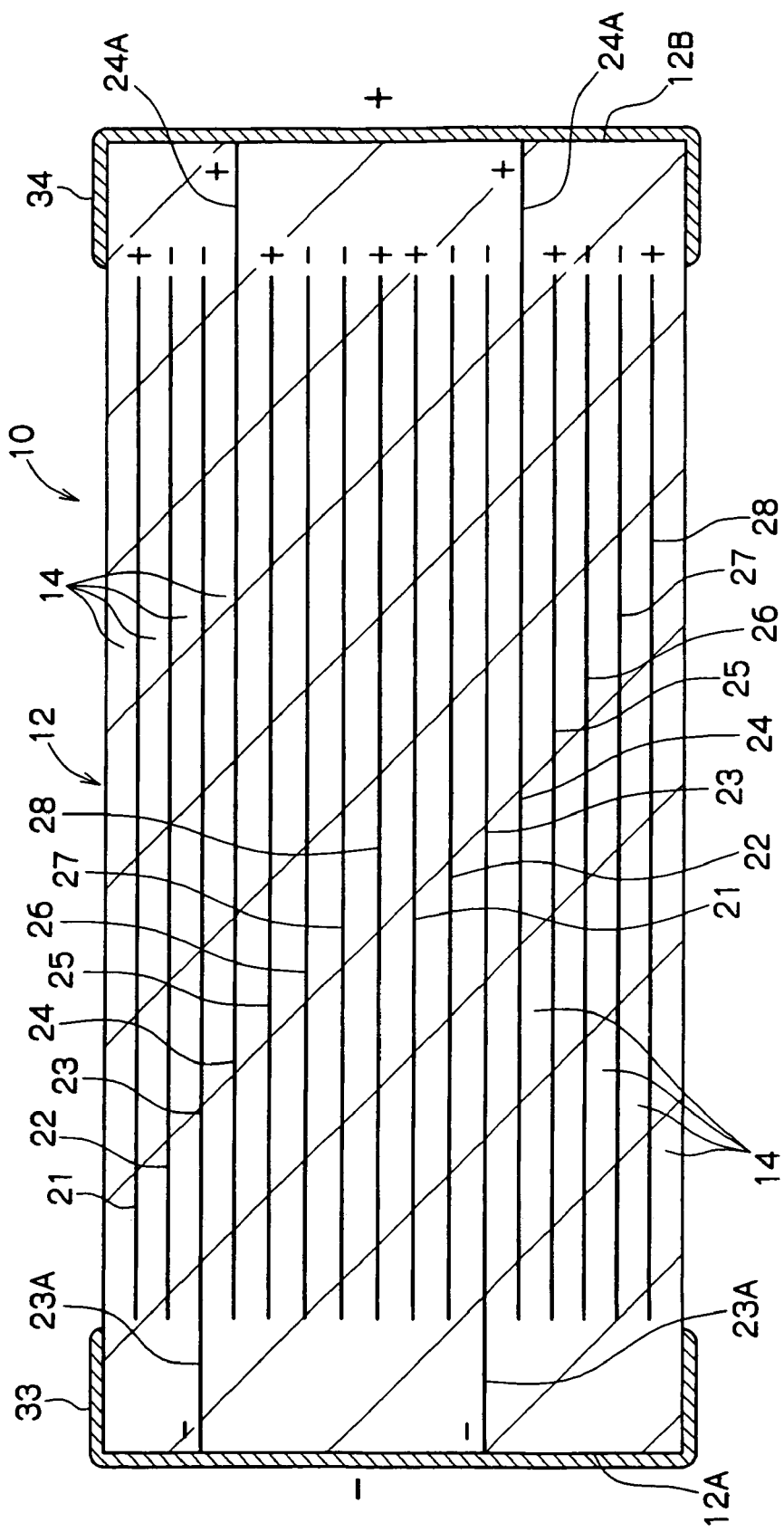
FIG. 4 is a cross-sectional view showing the multi-terminal multilayer capacitor according to the first embodiment of the present invention and is a cross-sectional view taken along the 4—4 line pointed by the arrows in FIG. 3.

At a predetermined height position in the dielectric element 12 shown in FIG. 4, an internal electrode 21 in a planar shape is disposed, and a leadout portion 21A is led out from a back end portion on a left end side in FIG. 1 of the internal electrode 21. An internal electrode 22 also in a planar shape is disposed under the internal electrode 21 across a ceramic layer 14 in the dielectric element 12, and a leadout portion 22A is led out from a back end portion on a right end side in FIG. 1 of the internal electrode 22.

Similarly, an internal electrode 23 also in a planar shape is disposed under the internal electrode 22 across a ceramic layer 14 in the dielectric element 12, and a leadout portion 23A is led out from a position closer to the back end portion on the left end side in FIG. 1 of this internal electrode 23. Further, an internal electrode 24 also in a planar shape is disposed under the internal electrode 23 across a ceramic layer 14 in the dielectric element 12, and a leadout portion 24A is led out from a position closer to the back end portion on the right end side in FIG. 1 of this internal electrode 24.

Similarly, an internal electrode 25 also in a planar shape is disposed under the internal electrode 24 across a ceramic layer 14 in the dielectric element 12, and a leadout portion 25A is led out from a position closer to a front end portion on the left end side in FIG. 1 of this internal electrode 25. Further, an internal electrode 26 also in a planar shape is disposed under the internal electrode 25 across a ceramic layer 14 in the dielectric element 12, and a leadout portion 26A is led out from a position closer to a front end portion on the right end side in FIG. 1 of this internal electrode 26.

Similarly, an internal electrode 27 also in a planar shape is disposed under the internal electrode 26 across a ceramic layer 14 in the dielectric element 12, and a leadout portion 27A is led out from the front end portion on the left end side in FIG. 1 of this internal electrode 27. Further, an internal electrode 28 also in a planar shape is disposed under the internal electrode 27 across a ceramic layer 14 in the dielectric element 12, and a readout portion 28A is led out from the front end portion on the right end side in FIG. 1 of this internal electrode 28.

Meanwhile, under the internal electrode 28 across a ceramic layer 14 in the dielectric element 12, eight internal electrodes 21 to 28 similar to the above described ones are stacked in the same order and in the same manner. Therefore, in this embodiment, two sets of the internal electrodes 21 to 28 are disposed. However, a larger number of sets of the internal electrodes 21 to 28 may be disposed.

The centers of the internal electrodes, from the internal electrodes 21 to the internal electrodes 28, each formed in a rectangular shape are substantially aligned with the center of the dielectric element 12. Further, the longitudinal and lateral dimensions of the internal electrodes 21 to the internal electrodes 28 are smaller than the lengths of corresponding sides of the dielectric element 12.

Therefore, the internal electrodes, from the internal electrodes 21 to the internal electrodes 28, are stacked in the dielectric element 12 so as to face each other while being separated from each other by the ceramic layers 14. Accordingly, such a structure is obtained that these leadout portions, from the leadout portions 21A to 28A, positioned at totally eight places are led out from the internal electrodes 21 to 28 respectively to positions not coinciding with one another in a stack direction.

Figure 3:
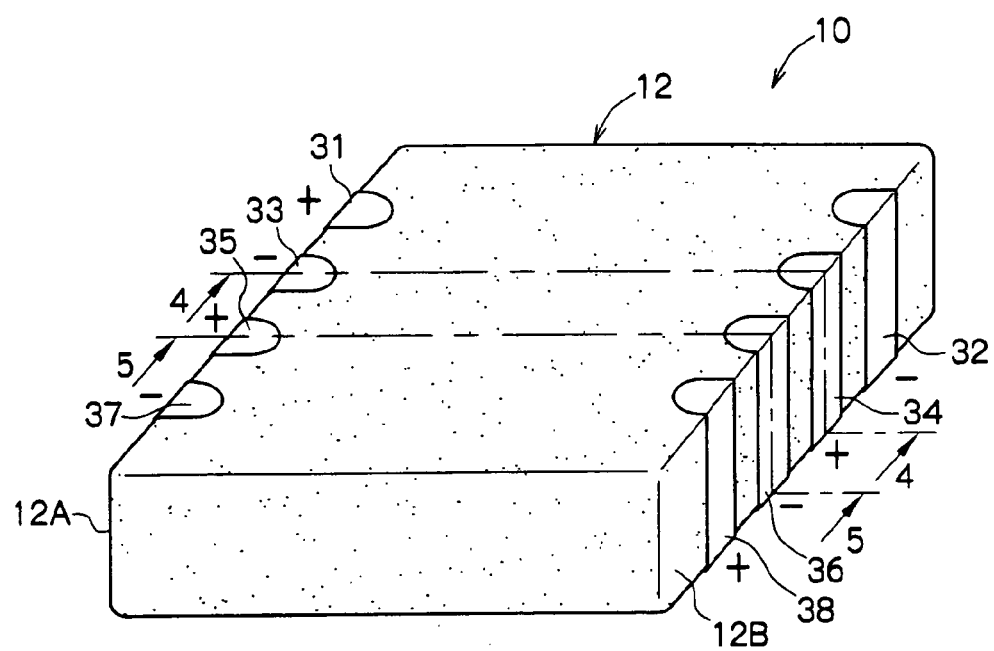
FIG. 3 is a perspective view showing the multi-terminal multilayer capacitor according to the first embodiment of the present invention.

As shown in FIG. 3, a terminal electrode 31 connected to the leadout portions 21A of the internal electrodes 21 is disposed at a back end portion in a left side face 12A of the dielectric element 12. A terminal electrode 32 connected to the leadout portions 22A of the internal electrodes 22 is disposed at a back end portion in a right side face 12B of the dielectric element 12. Further, a terminal electrode 33 connected to the leadout portions 23A of the internal electrodes 23 is disposed at a position closer to the back end portion in the left side face 12A of the dielectric element 12. A terminal electrode 34 connected to the leadout portions 24A of the internal electrodes 24 is disposed at a position closer to the back end portion in the right side face 12B of the dielectric element 12.

Further, a terminal electrode 35 connected to the leadout portions 25A of the internal electrodes 25 is disposed at a position closer to a front end portion in the left side face 12A of the dielectric element 12. A terminal electrode 36 connected to the leadout portions 26A of the internal electrodes 26 is disposed at a position closer to a front end portion in the right side face 12B of the dielectric element 12. Further, a terminal electrode 37 connected to the leadout portions 27A of the internal electrodes 27 is disposed at the front end portion in the left side face 12A of the dielectric element 12. A terminal electrode 38 connected to the leadout portions 28A of the internal electrodes 28 is disposed at the front end portion in the right side face 12B of the dielectric element 12.

In short, the leadout portions 21A of the internal electrodes 21 to the leadout portions 28A of the internal electrodes 28 are disposed at positions not coinciding with one another in the right and left sides in FIG. 1 of these internal electrodes. Accordingly, the terminal electrodes 31 to 38 are disposed on the left and right side faces 12A, 12B of the dielectric element 12, being connected in sequence to the different internal electrodes 21 to 28 via the leadout portions 21A to 28A, and for example, the terminal electrodes adjacent to each other are usable with polarities different from each other.

Therefore, in this embodiment, as shown in FIG. 3, the terminal electrodes 31, 33, 35, 37 are arranged in this order from the back side on the left side face 12A of the multi-terminal multilayer capacitor 10, and the terminal electrodes 32, 34, 36, 38 are arranged in this order from the back side on the right side face 12B thereof. Therefore, the terminal electrodes 31 to 38 are disposed on the two side faces 12A, 12B out of four side faces of the dielectric element 12 in a hexahedron shape which is a rectangular parallelepiped shape.

Meanwhile, when the multi-terminal multilayer capacitor 10 of this embodiment is used, the internal electrode 22 and the internal electrode 23 disposed adjacent to each other in the dielectric element 12 have the same polarity, for example, negative polarity as shown in FIG. 2(B) and FIG. 2(C), and the internal electrode 24 and the internal electrode 25 similarly have the same polarity, for example, positive polarity as shown in FIG. 2(D) and FIG. 2(E). In the same situation, the internal electrode 26 and the internal electrode 27 similarly have the same polarity, for example negative polarity as shown in FIG. 2(F) and FIG. 2(G), and the internal electrode 28 and the internal electrode 21 similarly have the same polarity, for example, positive polarity as shown in FIG. 2(H) and FIG. 2(A). However, since high-frequency electric current generally passes in the internal electrodes 21 to 28, the polarity is reversed at the next moment.

Figure 5:
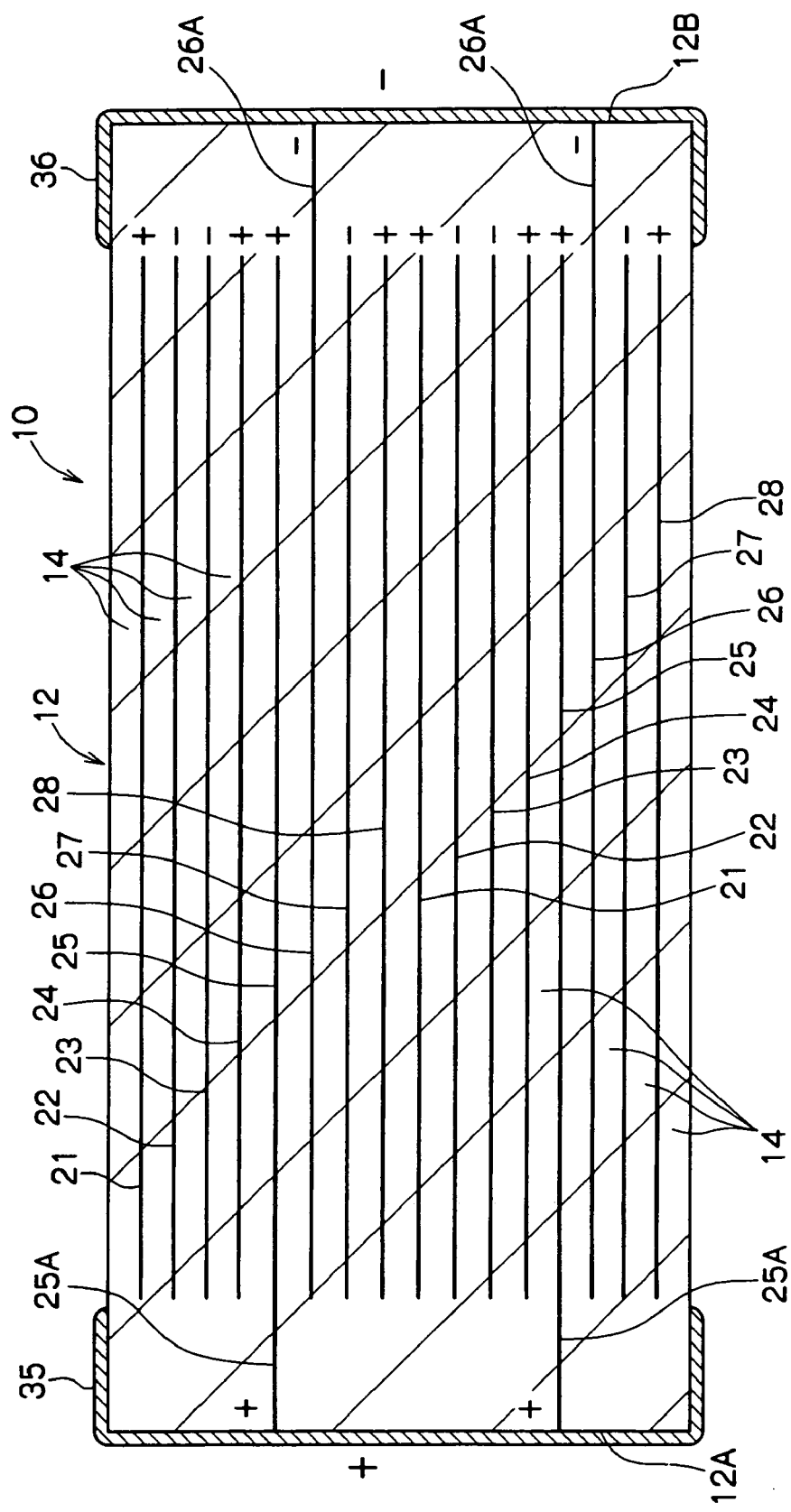
FIG. 5 is a cross-sectional view showing the multi-terminal multilayer capacitor according to the first embodiment of the present invention and is a cross-sectional view taken along the 5—5 line pointed by the arrows in FIG. 3.

Therefore, the internal electrodes 22, 23 constitute, for example, a pair of first internal conductors, and the internal electrodes 24, 25 positioned thereunder in FIG. 4 and FIG. 5 constitute, for example, a pair of second internal conductors. Similarly, the internal electrodes 26, 27 positioned under the internal electrodes 24, 25 constitute, for example, a pair of first internal conductors, and the internal electrodes 28, 21 positioned thereunder constitute, for example, a pair of second internal conductors. Accordingly, the leadout portions 22A, 23A, 26A, 27A of the internal electrodes 22, 23, 26, 27 serve as first leadout portions, and the leadout portions 24A, 25A, 28A, 21A of the internal electrodes 24, 25, 28, 21 serve as second leadout portions.

Therefore, in this embodiment, for example, the leadout portions 23A and the leadout portions 24A are led out respectively from the internal electrodes 23 and the internal electrodes 24 disposed adjacent to each other, out of the internal electrodes 22, 23 and the internal electrodes 24, 25. Note that the leadout portions 23A and the leadout portions 24A are led out to substantially the same positions in the side faces 12A, 12B facing each other of the dielectric element 12, respectively, as shown in FIG. 4.

Similarly, for example, the leadout portions 25A and the leadout portions 26A are led out respectively from the internal electrodes 25 and the internal electrodes 26 disposed adjacent to each other, out of the internal electrodes 24, 25 and the internal electrodes 26, 27. Note that the leadout portions 25A and the leadout portions 26A are led out to substantially the same positions in the side faces 12A, 12B facing each other of the dielectric element 12, respectively, as shown in FIG. 5.

Next, a usage example of the multi-terminal multilayer capacitor 10 according to this embodiment will be described based on FIG. 6.

Figure 6:
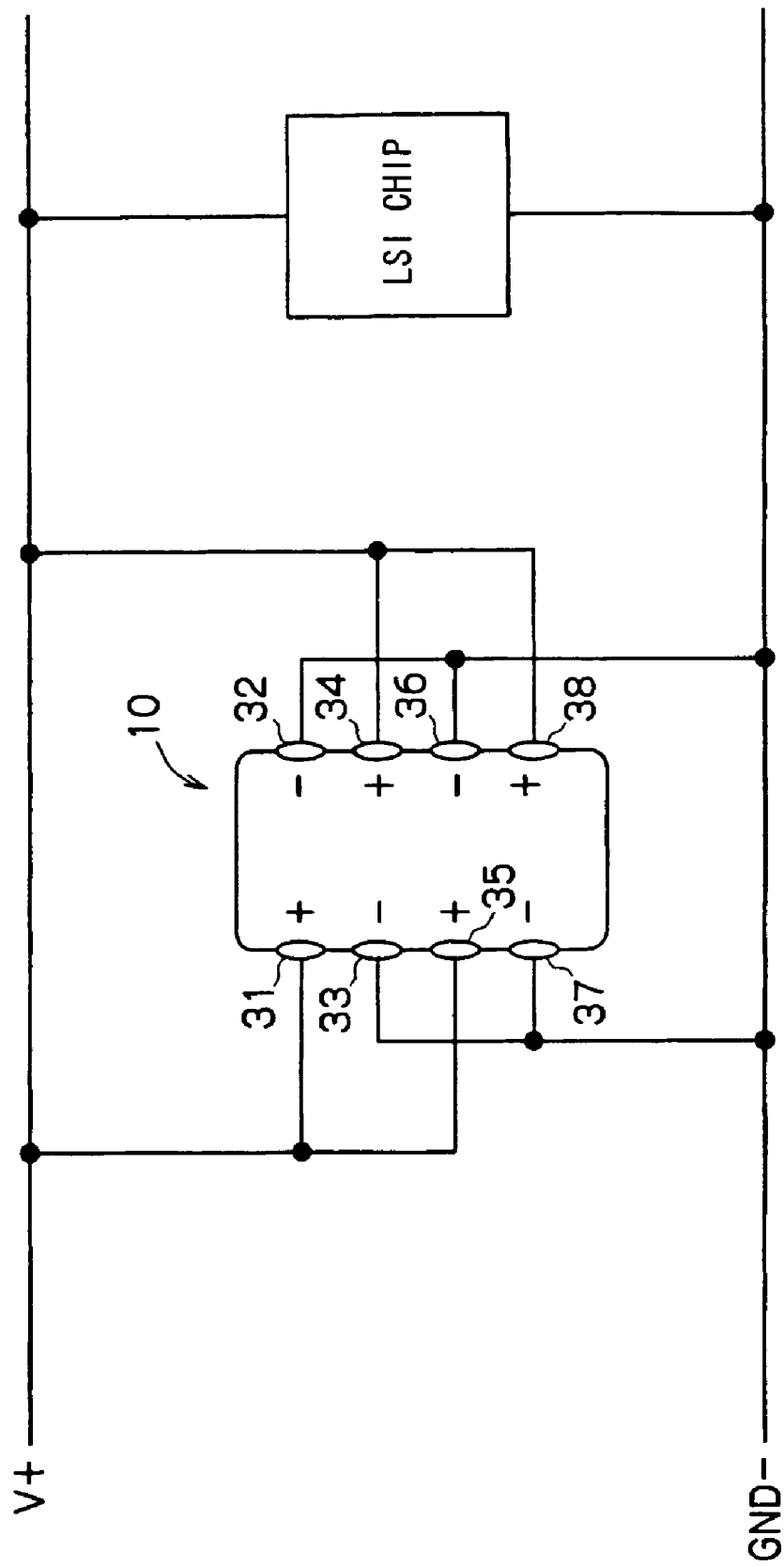
FIG. 6 is a circuit diagram showing a usage state of the multi-terminal multilayer capacitor according to the first embodiment of the present invention.

As shown in FIG. 6, the multi-terminal multilayer capacitor 10 according to this embodiment is disposed between a ground terminal GND and a terminal V having a predetermined potential to be in parallel with a LSI chip. Note that the terminal electrodes facing each other in FIG. 6 of the multi-terminal multilayer capacitor 10 are connected to different terminals different of either the ground terminal GND or the terminal V. Further, the terminal electrodes adjacent to each other in this drawing are also connected to different terminals of the ground terminal GND or the terminal V.

Therefore, the terminal electrodes facing each other out of the terminal electrodes 31 to 38 disposed on both sides of the multi-terminal multilayer capacitor 10 according to this embodiment, and the terminal electrodes adjacent to each other out of the terminal electrodes 31 to 38 are used with opposite polarities to each other in the usage example in FIG. 6.

Next, the operation of the multi-terminal multilayer capacitor 10 according to this embodiment will be described.

According to the multi-terminal multilayer capacitor 10 of this embodiment, the internal electrodes 22, 23 which are the pair of first internal conductors having the same polarity are disposed in the dielectric element 12 formed of a stack of the ceramic layers 14 which are dielectric layers, so as to be adjacent to each other while being separated from each other by the ceramic layer 14. Further, the internal electrodes 24, 25 which are the pair of second internal conductors having the same polarity are disposed under these internal electrodes 22, 23 across the ceramic layer 14 in the dielectric element 12 so as to be adjacent to each other while being separated from each other by the ceramic layer 14.

Similarly, the internal electrodes 26, 27 which are the pair of first internal conductors having the same polarity are disposed under the internal electrodes 24, 25 across the ceramic layer 14 in the dielectric element 12 so as to be adjacent to each other while being separated from each other by the ceramic layer 14. Similarly, the internal electrodes 28, 21 which are the pair of second internal conductors having the same polarity are disposed under the internal electrodes 26, 27 across the ceramic layer 14 in the dielectric element 12 so as to be adjacent to each other while being separated from each other by the ceramic layer 14.

In this embodiment, as shown in FIG. 4 and FIG. 5, since, for example, two sets of these internal electrodes 21 to 28 are provided in the dielectric element 12, the plural pairs of first internal conductors and the plural pairs of second internal conductors are alternately stacked in the dielectric element 12.

Further, for example, one leadout portion 22A and one leadout portion 23A are led out from each of the internal electrodes 22 and from each of the internal electrodes 23 respectively, and one leadout portion 24A and one leadout portion 25A are led out from each of the internal electrodes 24 and from each of the internal electrodes 25 respectively. Note that the leadout portion 23A and the leadout portion 24A led out respectively from the internal electrode 23 and the internal electrode 24 that are disposed adjacent to each other are led out to substantially the same positions in the side faces 12A, 12B facing each other of the dielectric element 12, respectively, as shown in FIG. 4.

Further, in this embodiment, the leadout portion 25A and the readout portion 26A shown in FIG. 5, the leadout portion 27A and the leadout portion 28A, and the leadout portion 21A and the leadout portion 22A are similarly led out to substantially the same positions respectively in the side faces 12A, 12B facing each other of the dielectric element 12. Since the eight terminal electrodes 31 to 38 are disposed on the two side faces 12A, 12B of the dielectric element 12, these leadout portions 21A to 28A are individually connected to the respective terminal electrodes 31 to 38.

In short, in this embodiment, for example, the internal electrode 23 and the internal electrode 24 disposed adjacent to each other, out of the internal electrodes 22, 23 and the internal electrodes 24, 25, serve as capacitor electrodes that are arranged in parallel while facing each other. In addition to this structure, the leadout portion 23A of the internal electrode 23 and the leadout portion 24A of the internal electrode 24 are led out to substantially the same positions in the two side faces 12A, 12B facing each other of the dielectric element 12, respectively, as described above.

Therefore, upon power-on of the multi-terminal multilayer capacitor 10, the internal electrode 23 and the internal electrode 24 that are disposed adjacent to each other via the ceramic layer 14 have polarities different from each other. Accordingly, for example, because of the arrangement of these leadout portion 23A and leadout portion 24A, electric current in the internal electrode 23 and electric current in the internal electrode 24 flow in reverse directions as shown in FIG. 2(C) and FIG. 2(D).

In addition, with the structure of this embodiment described above, because of the arrangement of the leadout portion 25A and the leadout portion 26A, electric current in the internal electrode 25 and electric current in the internal electrode 26 similarly flow in reverse directions as shown in FIG. 2(E) and FIG. 2(F). Similarly, because of the arrangement of the leadout portion 27A and the leadout portion 28A, electric current in the internal electrode 27 and electric current in the internal electrode 28 flow in reverse directions as shown in FIG. 2(G) and FIG. 2(H). Similarly, because of the arrangement of the leadout portion 21A and the leadout portion 22A, electric current in the internal electrode 21 and electric current in the internal electrode 22 flow in reverse directions as shown in FIG. 2(A) and FIG. 2(B).

Therefore, in the multi-terminal multilayer capacitor 10 according to this embodiment, magnetic fluxes generated by high-frequency current flowing in the internal electrodes are cancelled by each other to reduce parasitic inductance that the multi-terminal multilayer capacitor 10 itself has, so that equivalent series inductance (ESL) is reduced. Accordingly, ESL is further reduced to greatly reduce the total inductance of a circuit. As a result, according to this embodiment, it is possible to surely inhibit voltage fluctuation of a power source, so that the multi-terminal multilayer capacitor 10 optimum as a power source of a CPU can be obtained.

Meanwhile, in this embodiment, there are two sets of the pair of first internal conductors, namely, the internal electrodes 22, 23 and the internal electrodes 26, 27, and there are two sets of the pair of second internal conductors, namely, the internal electrodes 24, 25 and the internal electrodes 28, 21. Accordingly, two sets of the pair of first internal conductors and similarly two sets of the pair of second internal conductors are alternately stacked in the dielectric element 12, which makes it possible to dispose a large number of these internal electrodes serving as the capacitor electrodes. Consequently, it is possible to easily increase capacitance to a required size.

Further, in this structure, according to this embodiment, two sets of the internal electrodes 22, 23, 26, 27 are disposed in the dielectric element 12 with the readout portions 22A, 23A, 26A, 27A, which are the first leadout portions, being disposed at positions different from one another. Further, two sets of the internal electrodes 21, 24, 25, 28 are disposed in the dielectric element 12 with the leadout portions 21A, 24A, 25A, 28A, which are the second leadout portions, being disposed at positions different from one another. Therefore, the positions of the respective readout portions of the internal electrodes 22, 23, 26, 27 and the internal electrodes 21, 24, 25, 28 do not coincide with one another. Consequently, it is possible to reduce equivalent series inductance (ESL) as well as to make effective use of the two side faces 12A, 12B of the dielectric element 12.

In this embodiment, the eight terminal electrodes 31 to 38 are disposed on the two side faces 12A, 12B of the dielectric element 12, and the leadout portions 21A to 28A are individually connected to the respective terminal electrodes 31 to 38. This makes it possible to surely supply electric current to the internal electrodes 21 to 28, which serve as the capacitor electrodes, from an external circuit via these respective terminal electrodes 31 to 38, so that it is possible to surely achieve functions as the multi-terminal multilayer capacitor 10 owing to these terminal electrodes 31 to 38.

Next, a multi-terminal multilayer capacitor 10 according to a second embodiment of the present invention will be shown in FIG. 7(A) to FIG. 7(D) and FIG. 8, and this embodiment will be described based on these drawings. The same reference numerals or symbols are used to designate the same members as the members described in the first embodiment, and repeated description thereof will not be given.

In this embodiment unlike the first embodiment, only internal electrodes 22, 27 constitute a pair of first internal conductors, and only internal electrodes 21, 18 constitute a pair of second internal conductors as shown in FIG. 7(A) to FIG. 7(D). A plurality of sets of the internal electrodes 21, 22, 27, 28 are disposed in a dielectric element 12.

Figure 8:
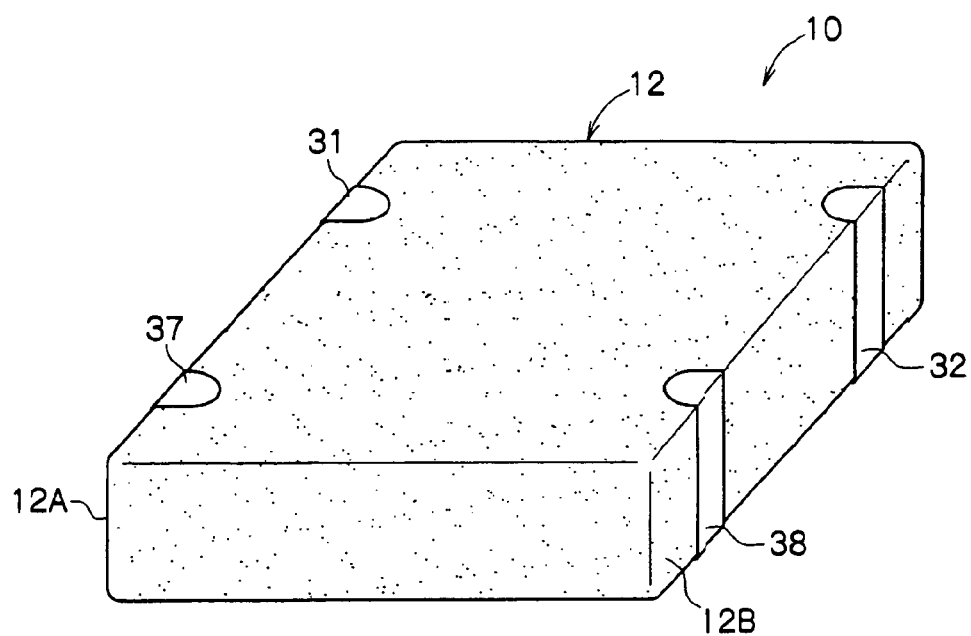
FIG. 8 is a perspective view showing the multi-terminal multilayer capacitor according to the second embodiment of the present.
Figure 9A:
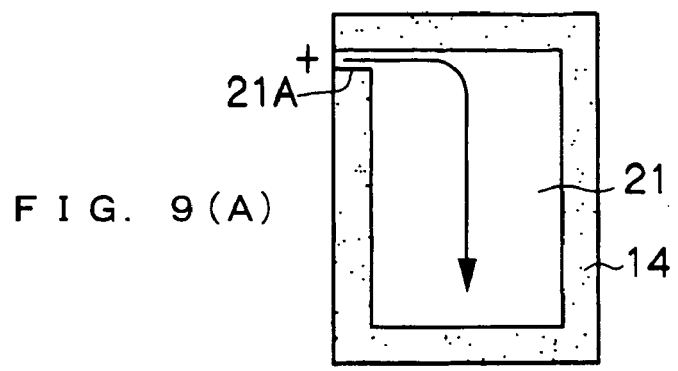
Figure 9B:
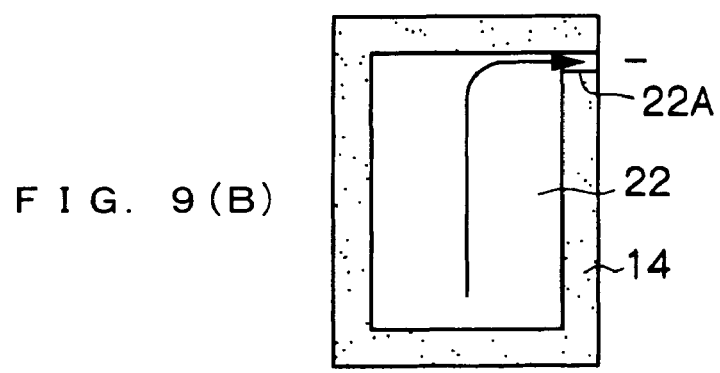
Figure 9C:
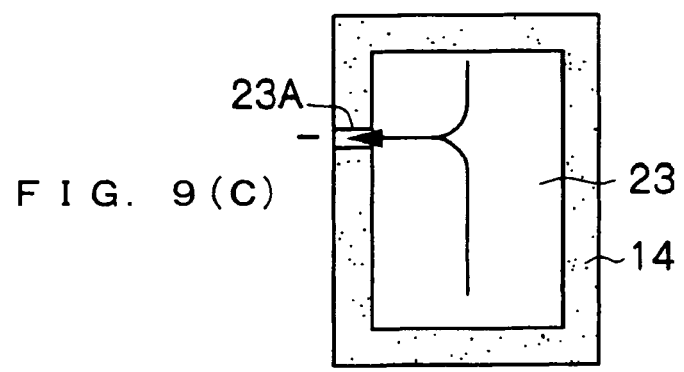
Figure 9D:
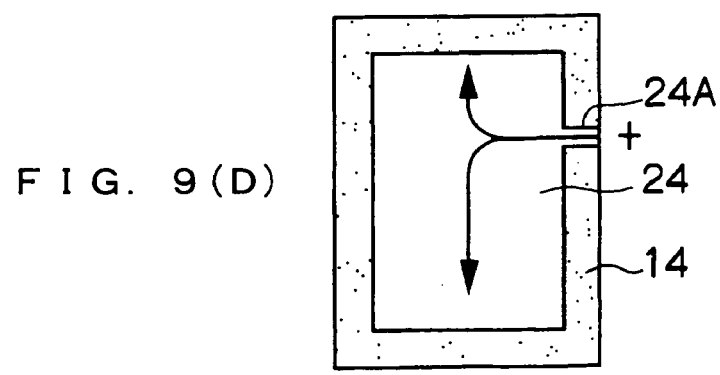
Figure 9E:
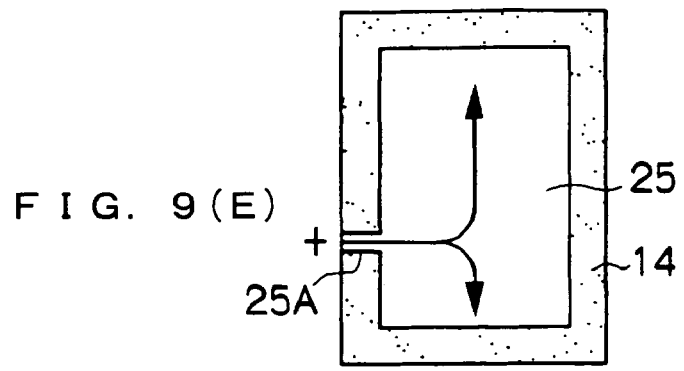
Figure 9F:
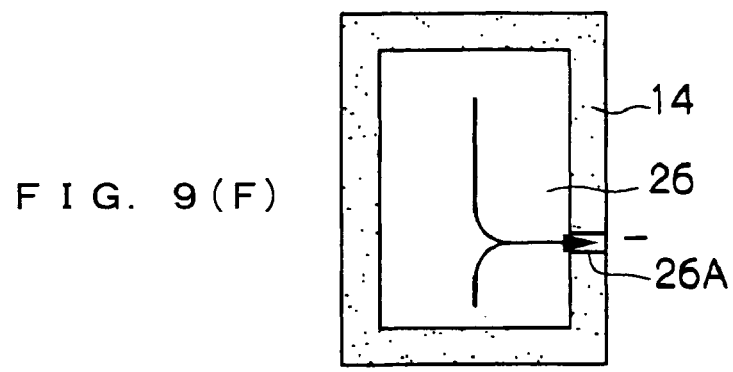
Figure 9G:
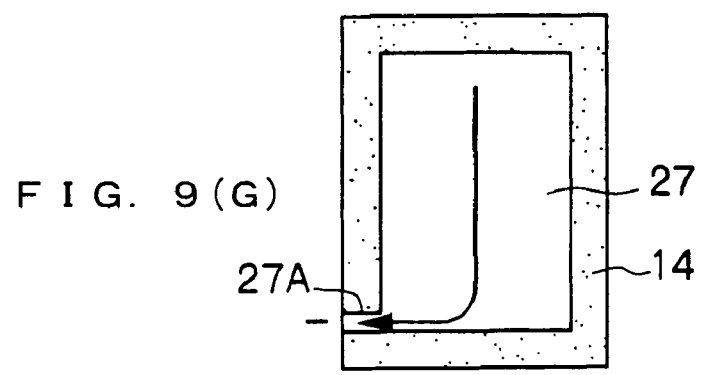
Figure 9H:
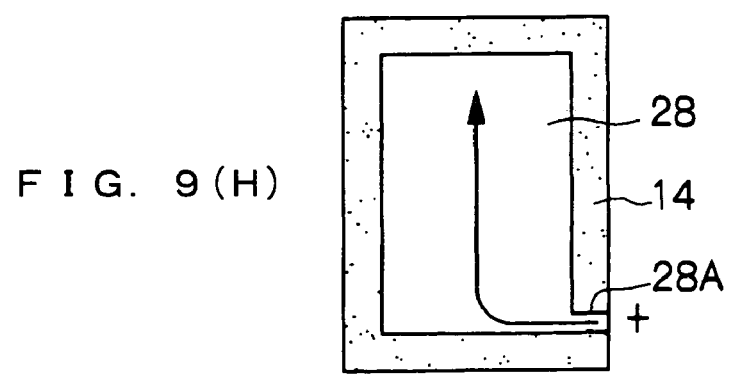

Accordingly, in this embodiment, four terminal electrodes 31, 32, 37, 38 are disposed on two side faces 12A, 12B of the dielectric element 12 as shown in FIG. 8. Further, in accordance with this structure, leadout portions 21A, 22A, 27A, 28A of the internal electrodes 21, 22, 27, 28 are individually connected to the respective electrodes 31, 32, 37, 38.

Therefore, the multi-terminal multilayer capacitor 10 according to this embodiment also has the internal electrodes 22, 27 serving as the pair of first internal conductors and the internal electrodes 28, 21 serving as the pair of second internal conductors as structured above. Accordingly, the leadout portion 27A of the internal electrode 27 and the leadout portion 28A of the internal electrode 28, out of the internal electrodes 21, 22, 27, 28, are led out to substantially the same positions in two side faces 12A, 12B facing each other of the dielectric element 12 respectively, as in the first embodiment. Similarly, the leadout portion 21A of the internal electrode 21 and the leadout portion 22A of the internal electrode 22 are led out to substantially the same positions in the two side faces 12A, 12B facing each other of the dielectric element 12, respectively.

As a result, in the multi-terminal multilayer capacitor 10 according to this embodiment, equivalent series inductance (ESL) is also reduced to greatly reduce the total inductance of a circuit, as in the first embodiment. Accordingly, it is possible to surely inhibit voltage fluctuation of a power source.

Next, a multi-terminal multilayer capacitor 10 according to a third embodiment of the present invention will be shown in FIG. 9(A) to FIG. 9(L) and FIG. 10, and this embodiment will be described based on these drawings. The same reference numerals or symbols are used to designate the same members as the members described in the first embodiment, and repeated description thereof will not be given. First, as shown in FIG. 9(A) to FIG. 9(H), in this embodiment, eight internal electrodes 21 to 28 are disposed in a dielectric element 12 in the same arrangement as that of the first embodiment.

However, this embodiment is different from the first embodiment in the following respect. Specifically, an internal electrode 41 similarly in a planar shape is disposed under an internal electrode 28 across a ceramic layer 14 in a dielectric element 12, and a leadout portion 41A is led out from a position closer to a right end portion on an upper end side in FIG. 9(I) of this internal electrode 41.

Similarly, an internal electrode 42 also in a planar shape is disposed under the internal electrode 41 across a ceramic layer 14 in the dielectric element 12, and a leadout portion 42A is led out from a position closer to a left end portion on the upper end side in FIG. 9(J) of the internal electrode 42. Further, an internal electrode 43 also in a planar shape is disposed under the internal electrode 42 across a ceramic layer 14 in the dielectric element 12, and a readout portion 43A is led out from a position closer to a right end portion on a lower end side in FIG. 9(K) of this internal electrode 43. Moreover, an internal electrode 44 also in a planar shape is disposed under the internal electrode 43 across a ceramic layer 14 in the dielectric element 12, and a leadout portion 44A is led out from a position closer to a left end portion on the lower end side in FIG. 9(L) of this internal electrode 44.

One set or more of twelve internal electrodes 21 to 28, 41 to 44 similar to those described above are stacked under the internal electrode 44 across a ceramic layer 14 in the dielectric element 12, in the same arrangement as above.

In short, leadout portions, namely, a leadout portion 21A of the internal electrode 21 to a leadout portion 28A of the internal electrode 28 are positioned so as not to coincide with one another in the left and right sides in FIG. 9(A) to FIG. 9(H) of these internal electrodes, as in the first embodiment. Besides, leadout portions, namely, the leadout portion 41A of the internal electrode 41 to the leadout portion 44A of the internal electrode 44 are positioned so as not coincide with one another in the upper/lower sides in FIG. 9(I) to FIG. 9(L) of these internal electrodes.

Figure 10:
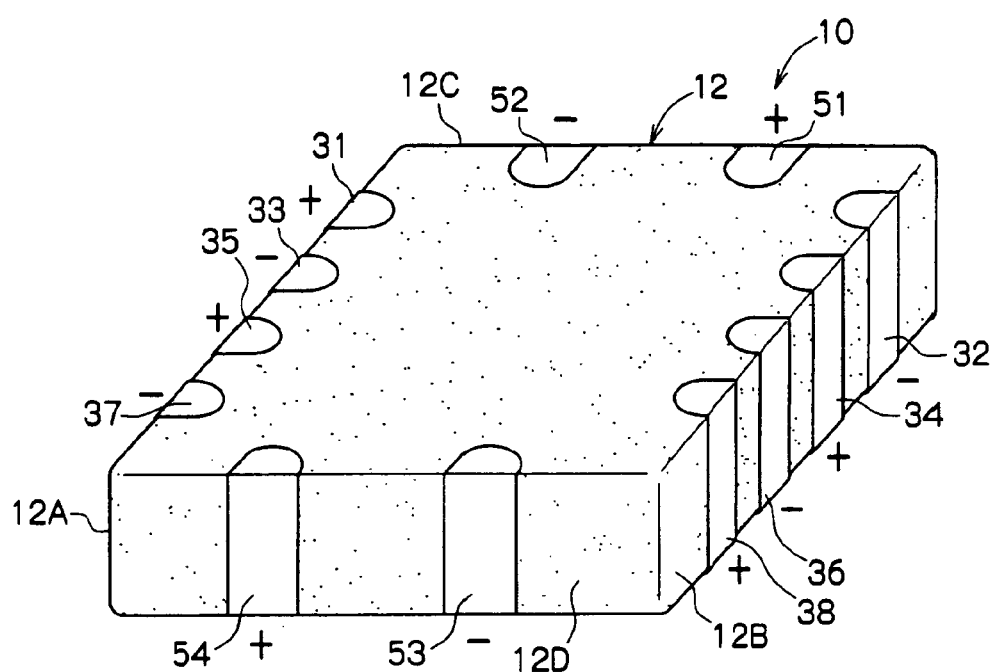
FIG. 10 is a perspective view showing the multi-terminal multilayer capacitor according to the third embodiment of the present invention.
Figure 11A:
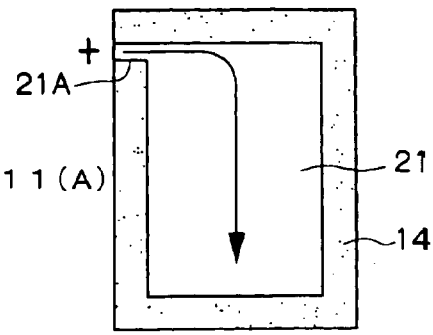
Figure 11E:
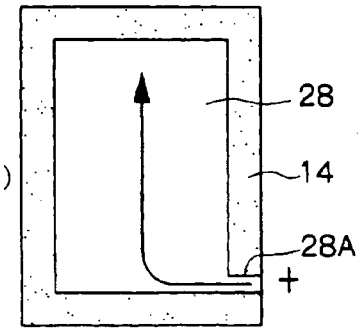
Figure 11B:
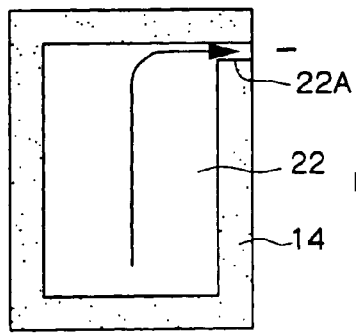
Figure 11F:
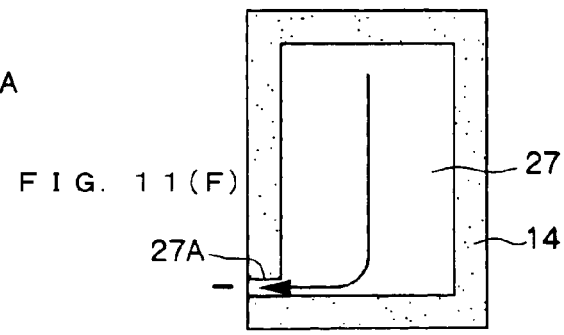
Figure 11C:
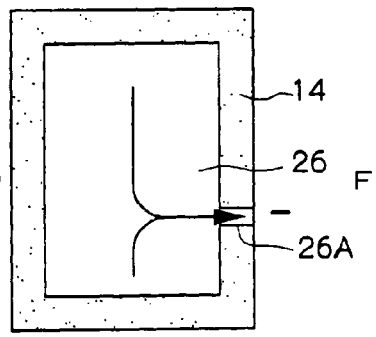
Figure 11G:
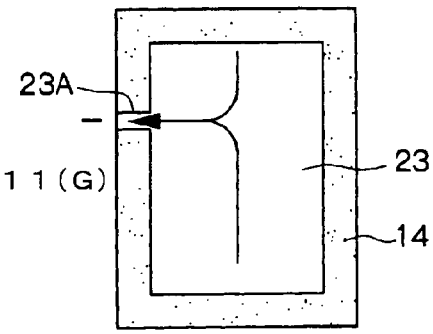
Figure 11D:
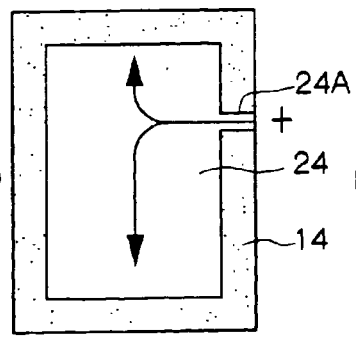
Figure 11H:
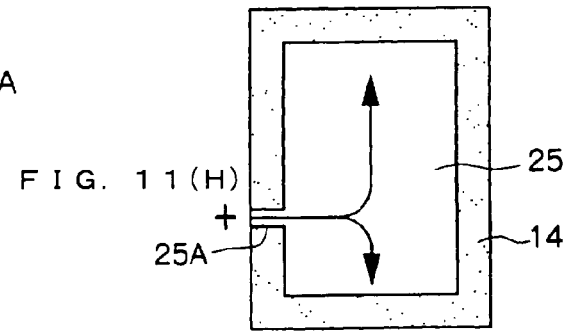
Figure 12A:
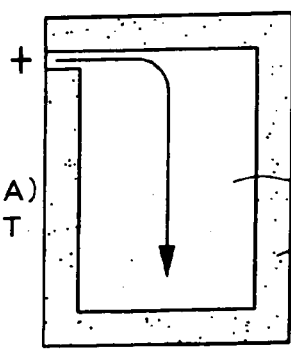
Figure 12B:
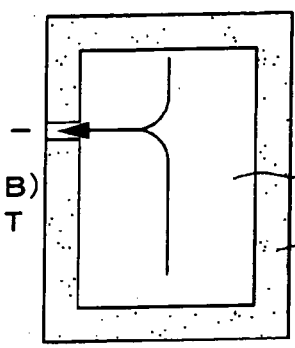
Figure 12C:
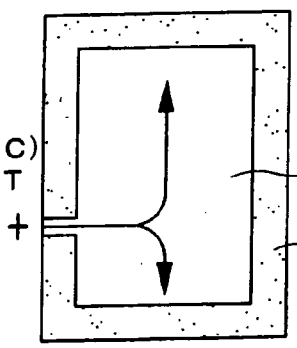
Figure 12D:
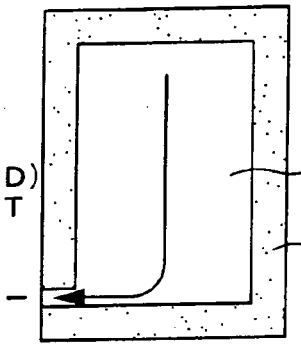
Figure 12E:
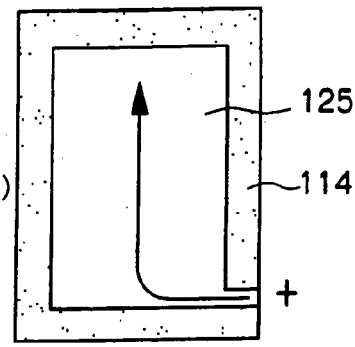
Figure 12F:
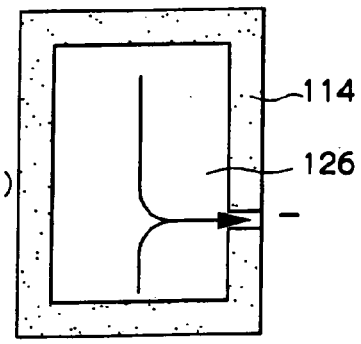
Figure 12G:
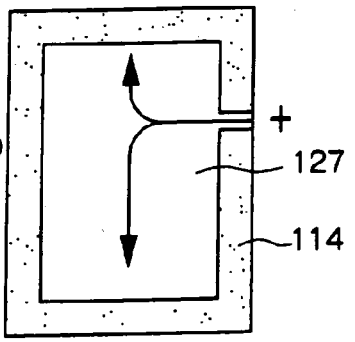
Figure 12H:
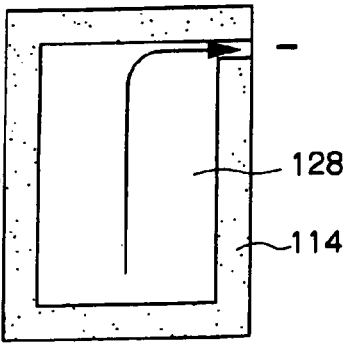

Accordingly, as shown in FIG. 10, terminal electrodes 31 to 38 are disposed on left and right side faces 12A, 12B of the dielectric element 12 so as to be connected to the different internal electrodes 21 to 28 via these leadout portions 21A to 28A in sequence, as in the first embodiment. Moreover, terminal electrodes 51 to 54 which are sequentially connected to the internal electrodes 41 to 44 via these leadout portions 41A to 44A are disposed on front and back side faces 12C, 12D of the dielectric element 12. For example, the terminal electrodes adjacent to each other are usable with opposite polarities to each other. Specifically, the leadout portions 41A are connected to the terminal electrode 51, the leadout portions 42A are connected to the terminal electrode 52, the leadout portions 43A are connected to the terminal electrode 53, and the leadout portions 44A are connected to the terminal electrode 54.

Therefore, unlike the first embodiment in which the internal electrodes 28, 21 constitute the pair of second internal conductors, the internal electrodes 28, 41 constitute a pair of second internal conductors in this embodiment. Further, the internal electrodes 42, 43 constitute a pair of first internal conductors, and the internal electrodes 44, 21 constitute a pair of second internal concoctors. Accordingly, the leadout portions 42A, 43A of these internal electrodes 42, 43 also serve as first readout portions, and the leadout portions 41A, 44A of these internal electrodes 41, 44 also serve as second leadout portions.

Therefore, for example, the leadout portion 41A and the leadout portion 42A are led out respectively from the internal electrode 41 and the internal electrode 42 disposed adjacent to each other, out of the internal electrodes 28, 41 and the internal electrodes 42, 43 in this embodiment. Note that the leadout portion 41A and the readout portion 42A are led out to positions adjacent to each other in the same side face 12C of the dielectric element 12, as shown in FIG. 10.

Similarly, for example, the readout portion 43A and the leadout portion 44A are led out respectively from the internal electrode 43 and the internal electrode 44 disposed adjacent to each other, out of the internal electrodes 42, 43 and the internal electrodes 44, 21. Note that the leadout portion 43A and the leadout portion 44A are led out respectively to positions adjacent to each other in the same side face 12D of the dielectric element 12, as shown in FIG. 10.

Therefore, upon power-on of this multi-terminal multilayer capacitor 10, the internal electrode 41 and the internal electrode 42 that are disposed adjacent to each other via the ceramic layer 14 have polarities different from each other. Accordingly, because of the structure described above, electric current in the internal electrode 41 and electric current in the internal electrode 42 flow in reverse directions. Further, electric current in the internal electrode 43 and electric current in the internal electrode 44 also flow in reverse directions.

As a result, in the multi-terminal multilayer capacitor 10 using the four side faces according to this embodiment, equivalent series inductance (ESL) is also reduced to greatly reduce the total inductance of a circuit as in the first embodiment. Accordingly, it is possible to surely inhibit voltage fluctuation of a power source.

Next, a multi-terminal multilayer capacitor 10 according to a fourth embodiment of the present invention is shown in FIG. 11(A) to FIG. 11(H), and this embodiment will be described based on these drawings. The same reference numerals or symbols are used to designate the same members as the members described in the first embodiment, and repeated description thereof will not be given.

As shown in FIG. 11(A) to FIG. 11(H), in this embodiment, a plurality of sets of eight internal electrodes 21 to 28 are disposed in a dielectric element 12 as in the first embodiment, but the arrangement thereof is different from that in the first embodiment. Specifically, in this embodiment, the internal electrode 26 is positioned under the internal electrode 22, the internal electrode 28 is positioned under the internal electrode 24, and from here, the internal electrode 27, the internal electrode 23, and the internal electrode 25 are disposed in this order.

Therefore, the internal electrodes 22, 26 constitute, for example, a pair of first internal conductors, and the internal electrodes 24, 28 positioned thereunder constitute a pair of second internal conductors. Similarly, the internal electrodes 27, 23 positioned under the internal electrodes 24, 28 constitute, for example, a pair of first internal conductors, and the internal electrodes 25, 21 positioned thereunder constitute a pair of second internal conductors. Accordingly, readout portions 22A, 26A, 27A, 23A of these internal electrodes 22, 26, 27, 23 serve as first leadout portions, and leadout portions 24A, 28A, 25A, 21A of these internal electrodes 24, 28, 25, 21 serve as second leadout portions.

Therefore, in this embodiment, for example, the leadout portion 26A and the leadout portion 24A are led out respectively from the internal electrode 26 and the internal electrode 24 disposed adjacent to each other, out of the internal electrodes 22, 26 and the internal electrodes 24, 28. Note that these leadout portion 26A and leadout portion 24A are led out to positions adjacent to each other in the same side face 12B of the dielectric element 12.

Similarly, for example, the leadout portion 23A and the leadout portion 25A are led out respectively from the internal electrode 23 and the internal electrode 25 disposed adjacent to each other, out of the internal electrodes 27, 23 and the internal electrodes 25, 21. Note that these leadout portion 23A and leadout portion 25A are led out to positions adjacent to each other in the same side face 12A of the dielectric element 12.

Therefore, upon power-on of the multi-terminal multilayer capacitor 10, the internal electrode 26 and the internal electrode 24 that are disposed adjacent to each other via a ceramic layer 14 have polarities different from each other. Accordingly, because of the structure described above, electric current in the internal electrode 26 and electric current in the internal electrode 24 flow in reverse directions. Further, electric current in the internal electrode 23 and electric current in the internal electrode 25 also flow in reverse directions. Therefore, the multi-terminal multilayer capacitor 10 according to this embodiment can also provide the same operations and effects as those of the first embodiment and the third embodiment.

Incidentally, the multi-terminal multilayer capacitor 10 of each of the above-described embodiments has ten-odd internal electrodes and four, eight, or twelve terminal electrodes, but the number of the layers, the number of the internal electrodes, and the number of the terminal electrodes are not limited to these numbers but may be larger.

According to the present invention, it is possible to obtain a multilayer capacitor with reduced equivalent series inductance. Further, the present invention is especially suitable as a multi-terminal multilayer ceramic chip capacitor capable of reducing voltage fluctuation of a power source of a CPU.

What is claimed is:

1. A multilayer capacitor comprising:
    a dielectric element formed of a stack of dielectric layers;
    a pair of first internal conductors with same polarity disposed in the dielectric element to be adjacent to each other while being separated from each other by the dielectric layer;
    first leadout portions led out from the pair of first internal conductors respectively, one being provided for each of the first internal conductors;
    a pair of second internal conductors with same polarity disposed in the dielectric element to be separated from the pair of first internal conductors by the dielectric layers and to be adjacent to each other while being separated from each other by the dielectric layer; and
    second leadout portions led out from the pair of second internal conductors respectively, one being provided for each of the second internal conductors,
    wherein the first leadout portion and the second leadout portion led out respectively from the first internal conductor and the second internal conductor disposed adjacent to each other are led out to substantially same positions in side faces facing each other of the dielectric element,
    wherein electric currents in the first leadout portions of the pair of first internal conductors flow in a same direction relative to the first internal conductors and electric currents in the second leadout portions of the pair of second internal conductors flow in a same direction relative to the second internal conductors, and
    wherein the electric currents in the first leadout portions and the electric currents in the second leadout portions flow in reverse directions.

2. The multilayer capacitor according to claim 1, further comprising:
    a plurality of terminal electrodes disposed on side faces of the dielectric element,
    wherein the first leadout portions and the second leadout portions are individually connected to the respective terminal electrodes.

3. The multilayer capacitor according to claim 1, wherein in part, the first leadout portion and the second leadout portion led out respectively from the first internal conductor and the second internal conductor disposed adjacent to each other are led out to positions adjacent to each other in a same side face of the dielectric element, respectively.

4. The multilayer capacitor according to claim 1, further comprising:
    a plurality of terminal electrodes disposed on each of two side faces of the dielectric element,
    wherein the first leadout portions and the second leadout portions are led out to the two side faces respectively to be individually connected to the respective terminal electrodes.

5. The multilayer capacitor according to claim 1, wherein each of the dielectric layers is a ceramic layer made of a sintered ceramic green sheet.

6. The multilayer capacitor according to claim 1, wherein each of the pairs of first internal conductors and second internal conductors is made of an internal electrode in a planar shape, and the internal electrodes are disposed in substantially centers of the respective dielectric layers.

7. A multilayer capacitor comprising:
    a dielectric element formed of a stack of dielectric layers;
    a pair of first internal conductors with same polarity disposed in the dielectric element to be adjacent to each other while being separated from each other by the dielectric layer;
    first leadout portions led out from the pair of first internal conductors respectively, one being provided for each of the first internal conductors;
    a pair of second internal conductors with same polarity disposed in the dielectric element to be separated from the pair of first internal conductors by the dielectric layers and to be adjacent to each other while being separated from each other by the dielectric layer; and
    second leadout portions led out from the pair of second internal conductors respectively, one being provided for each of the second internal conductors,
    wherein a plurality of sets of the pair of first internal conductors and a plurality of sets of the pair of second internal conductors are provided, and the pairs of first internal conductors and the pairs of second internal conductors are alternately stacked in the dielectric element,
    wherein the first leadout portions and the second leadout portions led out respectively from the first internal conductors and the second internal conductors disposed adjacent to each other are led out to substantially same positions in side faces facing each other of the dielectric element, respectively,
    wherein electric currents in the first leadout portions of the pair of first internal conductors flow in a same direction relative to the first internal conductors and electric currents in the second leadout portions of the pair of second internal conductors flow in a same direction relative to the second internal conductors, and
    wherein the electric currents in the first leadout portions and the electric currents in the second leadout portions flow in reverse directions.

8. The multilayer capacitor according to claim 7, wherein two sets of the pair of first internal conductors and two sets of the pair of second internal conductors are provided in the dielectric element.

9. The multilayer capacitor according to claim 7, further comprising:
    a plurality of terminal electrodes disposed on side faces of the dielectric element,
    wherein the first leadout portions and the second leadout portions are individually connected to the respective terminal electrodes.

10. The multilayer capacitor according to claim 7, wherein in part, the first leadout portion and the second leadout portion led out respectively from the first internal conductor and the second internal conductor disposed adjacent to each other are led out to positions adjacent to each other in a same side face of the dielectric element, respectively.

11. The multilayer capacitor according to claim 7, further comprising:
a plurality of terminal electrodes disposed on each of two side faces of the dielectric element,
wherein the first leadout portions and the second leadout portions are led out to the two side faces respectively to be individually connected to the respective terminal electrodes.

12. The multilayer capacitor according to claim 7, wherein each of the dielectric layers is a ceramic layer made of a sintered ceramic green sheet.

13. The multilayer capacitor according to claim 7, wherein each of the pairs of first internal conductors and second internal conductors is made of an internal electrode in a planar shape, and the internal electrodes are disposed in substantially centers of the respective dielectric layers.

14. A multilayer capacitor comprising:
a dielectric element formed of a stack of dielectric layers;
a pair of first internal conductors with same polarity disposed in the dielectric element to be adjacent to each other while being separated from each other by the dielectric layer;
first leadout portions led out from the pair of first internal conductors respectively, one being provided for each of the first internal conductors;
a pair of second internal conductors with same polarity disposed in the dielectric element to be separated from the pair of first internal conductors by the dielectric layers and to be adjacent to each other while being separated from each other by the dielectric layer; and
second leadout portions led out from the pair of second internal conductors respectively, one being provided for each of the second internal conductors,
wherein a plurality of sets of the pair of first internal conductors are disposed in the dielectric element with positions of the first leadout portions thereof being different from each other, and a plurality of sets of the pair of second internal conductors are disposed in the dielectric element with positions of the second leadout portions thereof being different from each other,
wherein the first leadout portions and the second leadout portions respectively led out from the first internal conductors and the second internal conductors disposed adjacent to each other are led out to substantially same positions in side faces facing each other of the dielectric element, respectively,
wherein electric currents in the first leadout portions of the pair of first internal conductors flow in a same direction relative to the first internal conductors and electric currents in the second leadout portions of the pair of second internal conductors flow in a same direction relative to the second internal conductors, and
wherein the electric currents in the first leadout portions and the electric currents in the second leadout portions flow in reverse directions.

15. The multilayer capacitor according to claim 14, wherein two sets of the pair of first internal conductors and two sets of the pair of second internal conductors are provided in the dielectric element.

16. The multilayer capacitor according to claim 14, further comprising:
a plurality of terminal electrodes disposed on side faces of the dielectric element,
wherein the first leadout portions and the second leadout portions are individually connected to the respective terminal electrodes.

17. The multilayer capacitor according to claim 14, wherein in part, the first leadout portion and the second leadout portion led out from the first internal conductor and the second internal conductor disposed adjacent to each other are led out to positions adjacent to each other in a same side face of the dielectric element, respectively.

18. The multilayer capacitor according to claim 14, further comprising:
a plurality of terminal electrodes disposed on each of two side faces of the dielectric element,
wherein the first leadout portions and the second leadout portions are led out to the two side faces respectively to be individually connected to the respective terminal electrodes.

19. The multilayer capacitor according to claim 14, wherein each of the dielectric layers is a ceramic layer made of a sintered ceramic green sheet.

20. The multilayer capacitor according to claim 14, wherein each of the pairs of first internal conductors and second internal conductors is made of an internal electrode in a planar shape, and the internal electrodes are disposed in substantially centers of the respectively dielectric layers.

* * * * *